US006545882B2

(12) United States Patent
Yang (10) Patent No.: US 6,545,882 B2
(45) Date of Patent: Apr. 8, 2003

(54) PWM CONTROLLER HAVING OFF-TIME MODULATION FOR POWER CONVERTER

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 09/931,639

(22) Filed: Aug. 15, 2001

(65) Prior Publication Data

US 2003/0034765 A1 Feb. 20, 2003

(51) Int. Cl.$^7$ .............................................. H02M 3/335
(52) U.S. Cl. .................................... 363/21.08; 323/284
(58) Field of Search ................................ 323/282, 284, 323/285, 288, 351; 363/16, 20–21.18

(56) References Cited

U.S. PATENT DOCUMENTS

| | | | |
|---|---|---|---|
| 5,515,257 A | 5/1996 | Ishii | 363/21 |
| 5,568,044 A | 10/1996 | Bittner | 323/272 |
| 5,745,352 A | 4/1998 | Sandri | 363/41 |
| 5,747,977 A | 5/1998 | Hwang | 323/284 |
| 5,790,391 A | 8/1998 | Stich | 363/24 |
| 5,903,138 A | 5/1999 | Hwang | 323/266 |
| 6,100,675 A | 8/2000 | Sudo | 323/282 |
| 6,157,182 A | 12/2000 | Tanaka et al. | 323/284 |
| 6,366,070 B1 * | 4/2002 | Cooke et al. | 323/284 |

* cited by examiner

Primary Examiner—Jessica Han
(74) Attorney, Agent, or Firm—J.C. Patents (57) ABSTRACT

The present invention provides an off-time modulation in PWM controller to increase the switching period for saving power consumption in the light load and no load conditions. The off-time modulation is achieved by keeping the charge current as a constant and moderating the discharge current of the saw-tooth-signal generator of the PWM controller. Decreasing the discharge current increases the switching period. A feedback voltage, which is derived from the voltage feedback loop, is taken as an index. The discharge current is modulated to be a function of the feedback voltage. A threshold voltage defines the level of the light load condition. The differential of the feedback voltage and the threshold voltage is converted to a current, which is then amplified and turned into the discharge current. A limiter clamps the maximum discharge current to decide the switching period in normal load and full load conditions and determines the dead time of PWM signal. Once the decrement of feedback voltage is close to the threshold voltage, the discharge current will decrease and switching period will be expanded continuously. When the feedback voltage is lower than the threshold voltage, a minimum discharge current decides the maximum switching period. Keeping the maximum on-time as the constant and increasing the switching period by increasing the off-time prevent the magnetic components, such as inductors and transformer, from being saturated.

6 Claims, 6 Drawing Sheets

PWM CONTROLLER HAVING OFF-TIME MODULATION FOR POWER CONVERTER

FIELD OF INVENTION

The present invention relates to switching mode power converter. More particularly, the present invention relates to the pulse width modulation (PWM) of the switching mode power converter.

BACKGROUND OF THE INVENTION

The PWM is a traditional technology that is used in the switching mode power converter to control the output power and achieves the regulation. Most of the equipments, such as mobile phone, TV game, and computer etc. are using PWM power converters to supply power and charge battery. Based on the restriction of environmental pollution, the computer and other equipment manufactures have been striving to meet the power management and energy conservation requirements. The embodiment of power management is to manage the system only consuming the power during the operation. And only a little quantity of power is consumed during non-operation mode. With respect to the power supply in a power management application, saving power in the no load or light load conditions is a major requirement. According to the invention, the object of the off-time modulation for the PWM control is to reduce the power consumption in light load and no load conditions.

Figure 1:
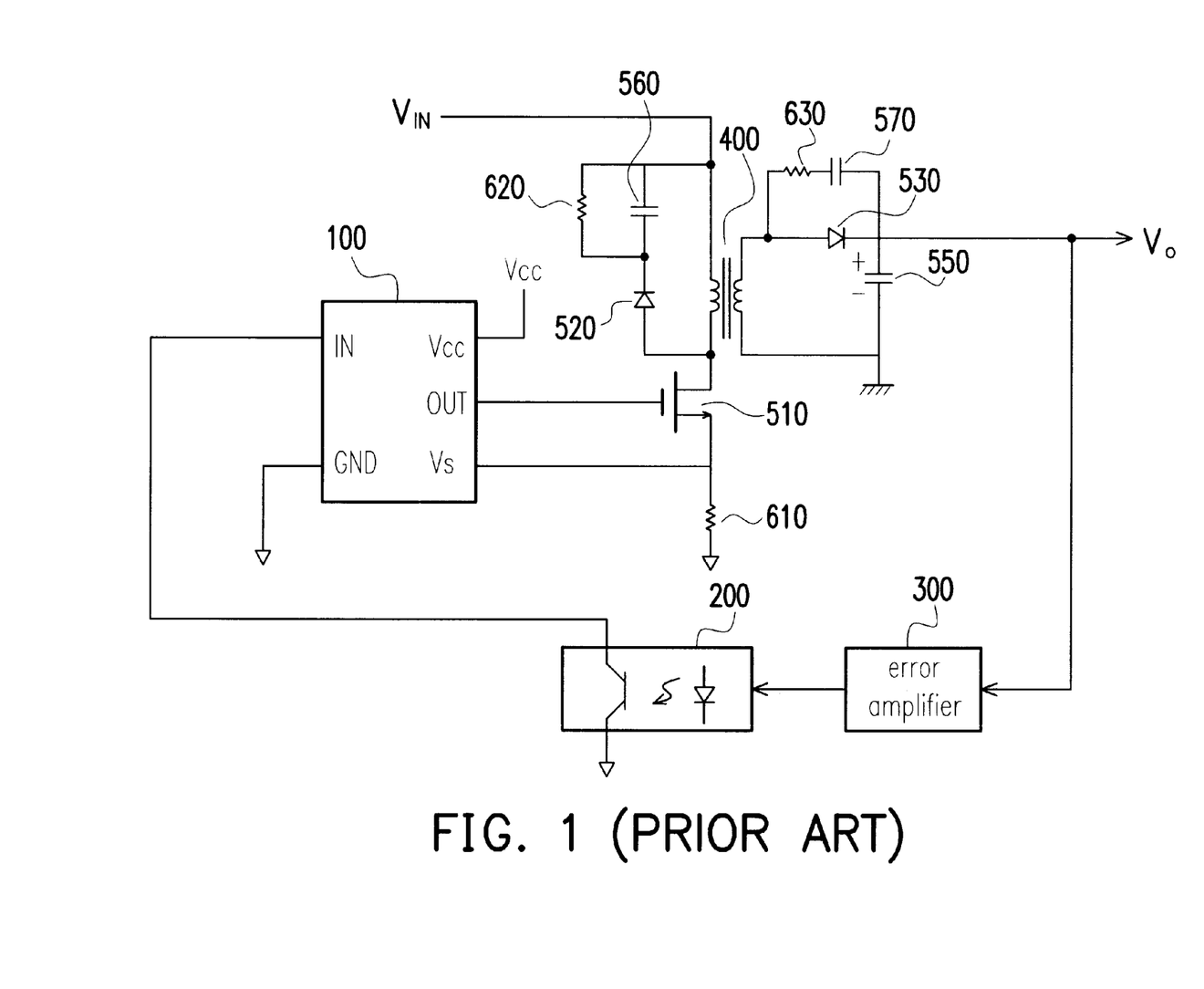
FIG. 1 shows a circuit schematic of the flyback power converter having a PWM controller.

FIG. 1 shows a circuit schematic of the flyback power converter, in which a PWM controller 100 controls the power output and achieves the regulation. A transistor 510 switches a transformer 400. When the transistor 510 is turned off, the leakage inductance of transformer 400 keeps the current, which has been flowing in it constantly for some short time. The part that current continues to flow into the slowly off-switching transistor 510, and the rest of that current flows into a capacitor 560 through a diode 520. A resistor 620 dissipates the energy that is charged in the capacitor 620. The diode 520, resistor 620, and capacitor 560 form a snubber circuit to reduce the leakage inductance spike and avoid the transistor 510 breakdown. At the instance of transistor 510 is switched on and an output rectifier 530 is switched off, there is an exponentially decaying oscillation or a 'ring' will come out. The ring is at a frequency determined by the inherent capacity of the off-switching rectifier 530 and the secondary inductance of the transformer 400. The amplitude and duration of the ring are determined by the output current and the reverse recovery times of the rectifier 530. The ring will cause RFI problem and can easily be eliminated by a snubber resistor 630 and a snubber capacitor 570 across the output rectifier 530. The major issues for the loss of the power conversion in the light load are illustrated as follows:

(1) The switching loss of the transistor 510, $P_Q$ can be expressed $(t_{ol}/T)(\int_0^{tol} V_Q \times Ip\, dt)$, where T is switching period, and $t_{ol}$ is the duration of overlap of voltage $V_Q$ and current Ip. Ip is the primary current of the transformer 400 and $V_Q$ is the voltage across the transistor 510.

(2) The switching loss of output rectifier 530, $P_D$ can be expressed $(t_{rr}/T)(\int_0^{trr} Vd \times Id\, dt)$, where $t_{rr}$ is the reverse recovery time of the rectifier. The Vd is the voltage across the rectifier when it is switched off. The Id is limited by the secondary inductance of the transformer 400.

(3) The core loss of transformer 400, $P_T$, it is in direct proportion to flux density Bm, core volume Vv and the switching period T. $P_T = K_0 \times Bm \times Vv/T$, where $K_0$ is a constant that is determined by the material of the core and etc.

(4) The power loss of the snubber, $P_R$ is stated as $P_R = (1/2) \times C \times Vd^2/T$, where C is the capacitance of the snubber, such as capacitor 570.

(5) The power loss of leakage inductance, $P_L$ can be stated by $P_L = (1/2) \times Lt \times Ip^2/T$, where the Lt is the primary leakage inductance of transformer 400. The resistor 620 dissipates the energy that is produced by the Lt.

We can find that all of the losses are indirectly proportional to the switching period T. Increase of the switching period T can reduce the power losses. However the power conversion is restricted to operate in a short switching period to shrink the size of power converter. To prevent the saturation of the transformer, the voltage-time ratio (Vin×Ton) has to be controlled to limit the flux density Bm of the transformer. It is given by $$Bm = (Vin \times Ton)/(Np \times Ae) \qquad (1)$$

where Vin is the input voltage of the power converter, Ton is the on-time of the switching period, Np is the primary turn number of the transformer, Ae is the cross area of the transformer. The value of (Np×Ae) represents the size of the transformer. A short switching period can earn a shorter Ton and a smaller transformer.

Take the flyback power converter as an example; the output power Po is equal to the $[1/(2 \times T)] \times Lp \times Ip^2$, where Lp is the primary inductance of the transformer 400. Due to Ip=(Vin/Lp)×Ton, it can be seen quantitatively as $$Po = (Vin^2 \times Ton^2)/(2 \times Lp \times T). \qquad (2)$$

This is seen from that equation 2, in the light load condition, Ton is short that obviously allows the switching period T to be expanded. The power consumption of the power converter is dramatically reduced in response to the increase of switching period in the light load and no load condition. Nevertheless, it is unsafe to increase the switching period without limitation. According to the behavior of the transformer that is showed in Equation 1, the transformer may be saturated due to an expanded Ton. A dynamic loading may produce an instant expended Ton. The dynamic loading means the load is instantly changed between the light load and the high load. The saturation of magnetic components, such as inductors and transformer, causes a current surge. The current surge will generate a spike-noise in power converter and also cause an over-stress damage to the switching devices such as transistors and rectifiers.

Figure 2:
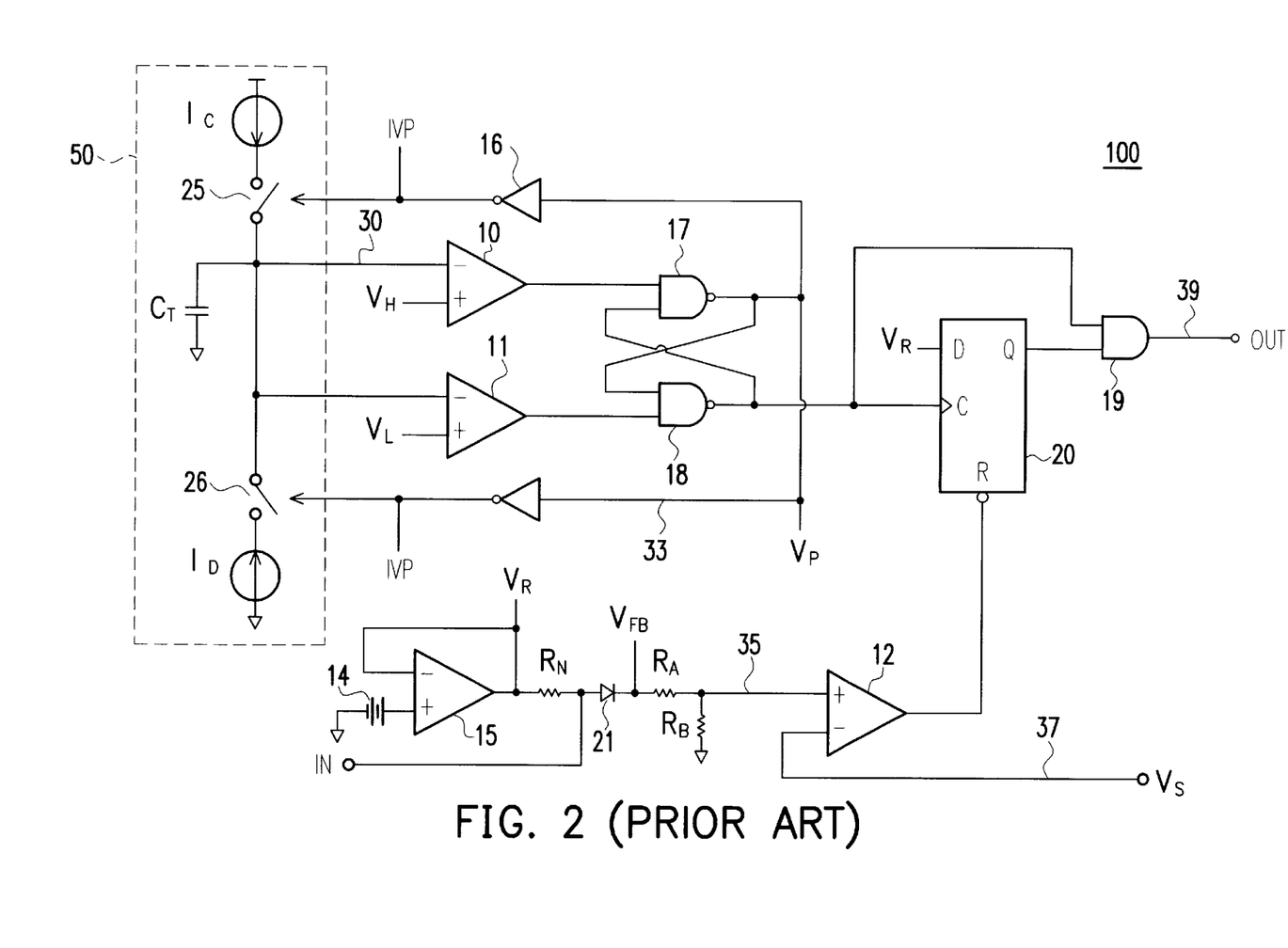
FIG. 2 shows the circuit schematic of the PWM-controller.
Figure 3:
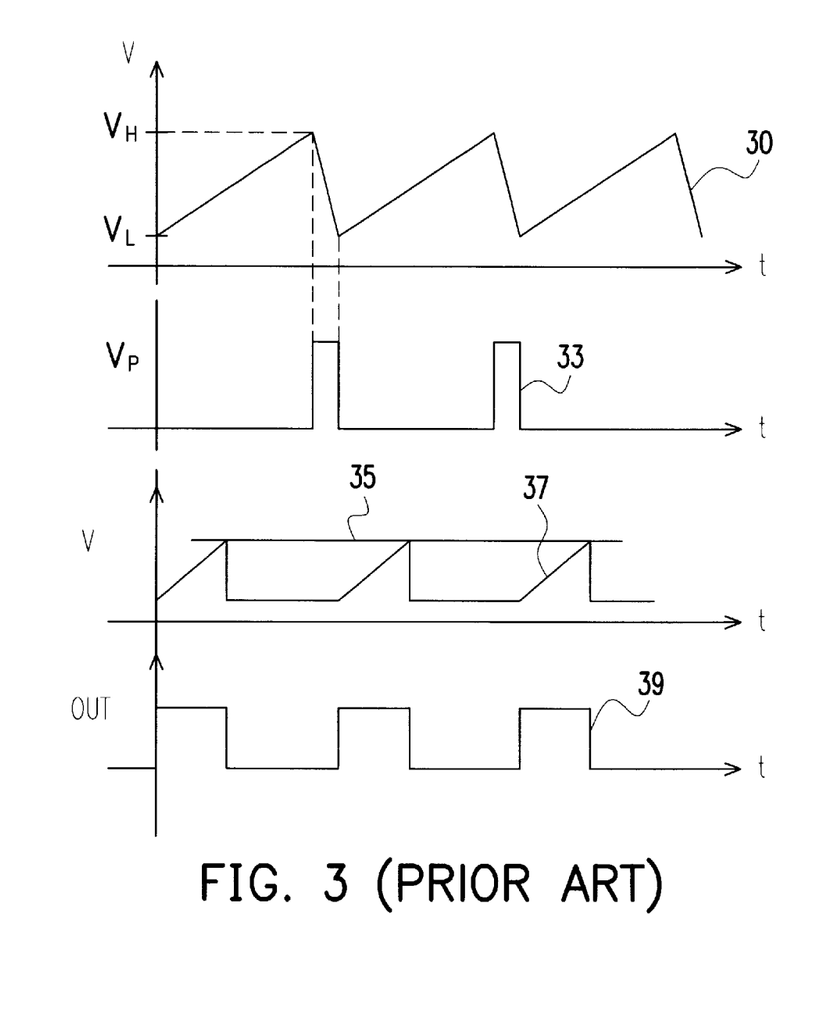
FIG. 3 displays the waveform for the circuit as shown in FIG. 2.

FIG. 2 shows the circuit schematic of the PWM-controller. FIG. 3 displays the waveform of the circuit in FIG. 2. When the switch 25 is turned on by a charge signal IVp, a charge current $I_C$ charges a capacitor $C_T$ and once the voltage across the capacitor $C_T$ reaches the high trip-point $V_H$ of the comparator 10, the comparator 10 and the NAND gates 17, 18 generate a discharge signal Vp to turn on the switch 26 that discharges the capacitor $C_T$ via a discharge current $I_D$. The charge current $I_C$ and the discharge current $I_D$ are correlated normally. The phenomenal of the discharge is continuous until the voltage of capacitor $C_T$ is lower than the low trip-point voltage $V_L$, in which a comparator 11 is enabled. The charge current $I_C$, the discharge current $I_D$, capacitor $C_T$, comparators 10, 11 and the switches 25, 26 and NAND gates 17, 18 form a saw-tooth-signal generator and produce a clock signal to clock-on the flip-flop 20. The comparator 12 resets the flip-flop 20 once the voltage in the pin Vs is higher than the signal 35, which is attenuated from the feedback signal $V_{FB}$ by the resistor $R_A$ and $R_B$. The resistor 610 converts the current information of the transformer 400 to a voltage signal 37, which is a ramp signal.

The input voltage Vin and the inductance of transformer 400 determine the slope of the ramp signal. $V_{R610}=R_{610}\times(V_{in}\times T_{on})/L_p$. The voltage in resistor 610 is the voltage signal 37, which drives the pin Vs of PWM controller. The feedback signal $V_{FB}$ is derived from the output of an optical-coupler 200 via a level shift diode 21. An error amplifier 300 drives the input of the optical-coupler 200. The input of the error amplifier 300 is connected to the output of the power converter Vo to develop the voltage feedback loop. Through the control of voltage feedback loop, the voltage of the $V_{FB}$ dominantly decides the output powers. The discharge time of capacitor $C_T$ determines the dead time of the PWM signal 39 that decides the maximum duty cycle of PWM controller 100. The PWM signal 39 is turned off in response to the high of the discharge signal Vp.

According to that observation, the expanding T can be achieved by expanding Toff, where Toff is the off-time of the switching period T. T=Ton+Toff. While the Toff is expanded in response to a low feedback voltage $V_{FB}$ in light load and no load conditions and the power consumption can be reduced.

SUMMARY OF THE INVENTION

The invention provides an off-time modulation for the PWM controller to increase the switching period in the light load and no load conditions. The off-time modulation is accomplished by moderating the discharge current of the saw-tooth-signal generator in the PWM controller. Reducing the discharge current increases the switching period, in which the off-time of the switching period is expanded. The charge current of the saw-tooth-signal generator is kept as a constant, in which the charge current decides the maximum on-time of the switching period. The feedback voltage, which is derived from the voltage feedback loop, is taken as an index. The discharge current is modulated to be a function of the feedback voltage. A threshold voltage is a constant that defines the level of the light load. The differential of the feedback voltage and the threshold voltage is converted to a current, which is then amplified by a current mirror amplifier and turned into the discharge current. A limiter clamps the maximum discharge current to set up the switching period in normal load and full load conditions and determines the dead time of PWM signal. Once the decrease of the feedback voltage is close to the level of the threshold voltage, the discharge current will be reduced and the switching period will be increased continuously. When the feedback voltage is lower than the threshold voltage, a minimum discharge current decides a maximum switching period. The gain of the current mirror amplifier decides the slope of the decrement of the discharge current in response to the feedback voltage decrement. The charge current associated with the discharge current decides the switching period of the PWM signal. The minimum discharge current determines the maximum off-time and the maximum switching period. Keeping the maximum on-time as the constant and increasing the switching period by increasing the off-time can prevent the magnetic components, such as inductors and transformer, from being saturated.

Advantageously, the off-time modulation in the PWM controller can reduce the power consumption of the power converter in light load and no load conditions. And the operation of power conversion in normal load and full load conditions are not affected by the off-time modulation.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 4:
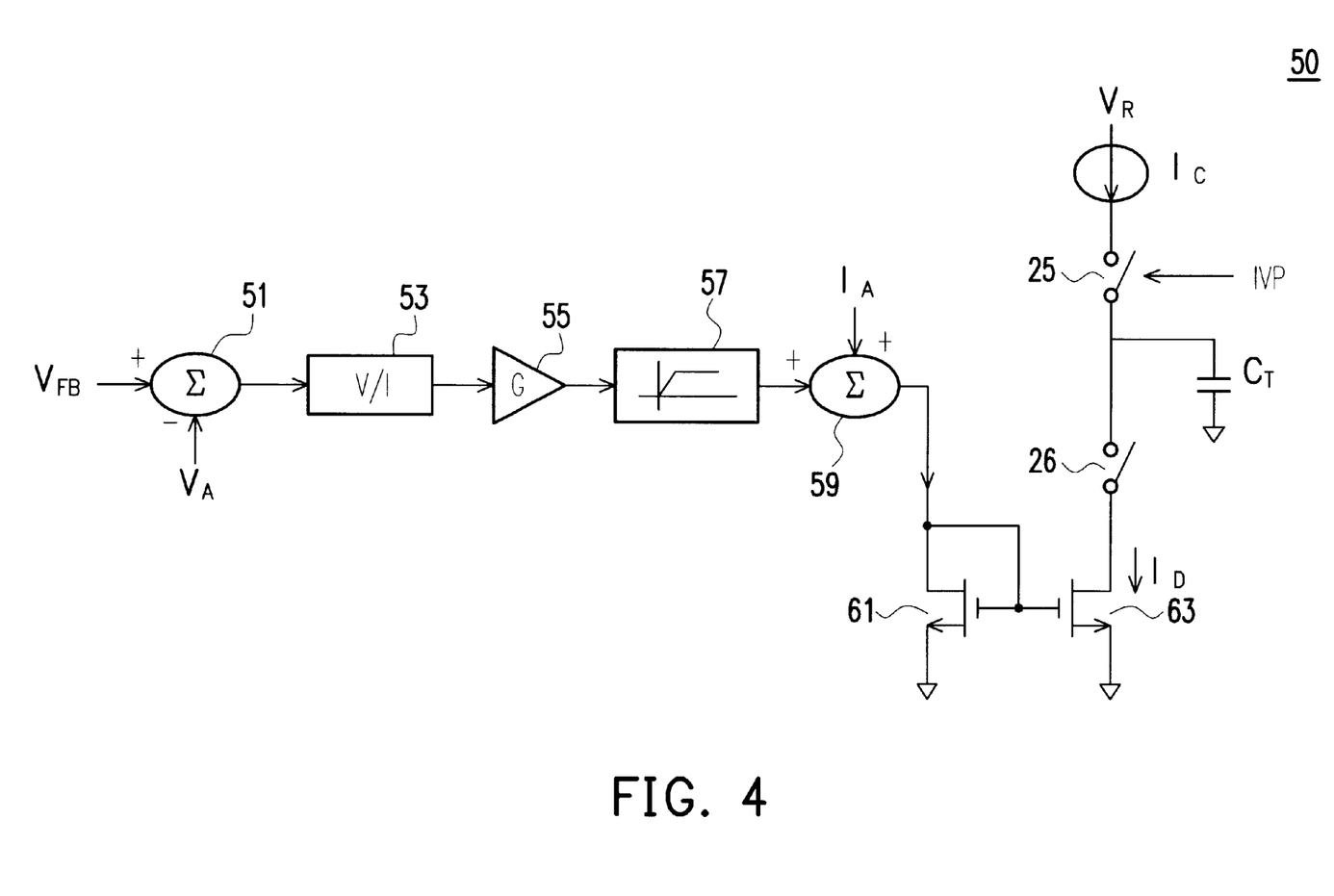
FIG. 4 schematically shows the block schematic of the off-time modulation according to a preferred embodiment of the present invention.

FIG. 4 schematically shows the block diagram of the off-time modulation according to one embodiment of the present invention.

Figure 5:
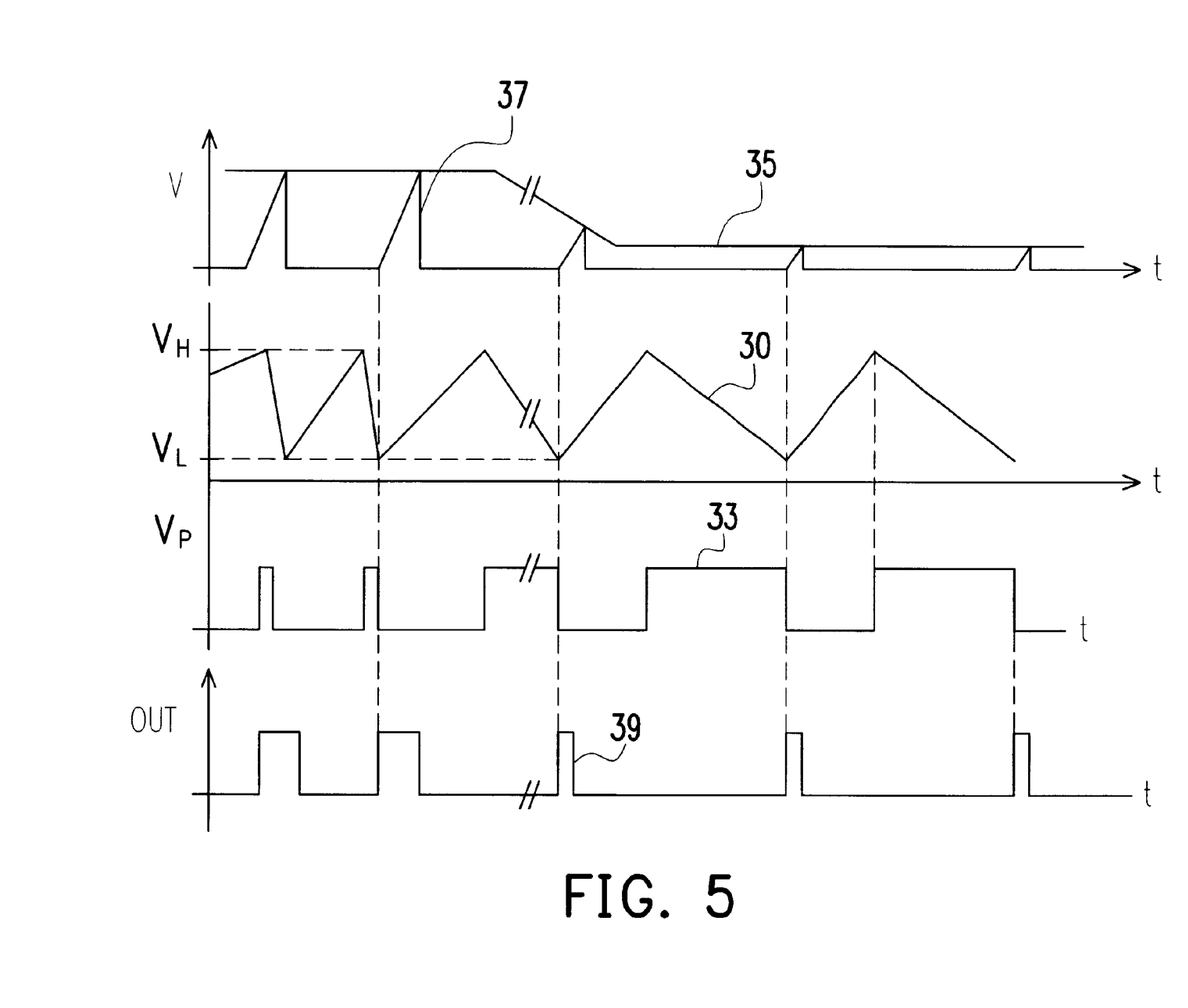
FIG. 5 displays the waveform of the circuit shown in FIG. 2, in which an off-time modulation is included.

The feedback voltage $V_{FB}$ derived from the voltage feedback loop subtracts a threshold voltage $V_A$ via an adder 51. The threshold voltage $V_A$ is a constant that defines the level of the light load. A V/I converter 53 converts the output of the adder 51 from voltage to a V/I current. A mirror amplifier 55 magnifies the V/I current to an amplified current. A limiter 57 generates a limited current Ilimit, in which the amplitude of the amplified current is clamped between the range of zero and an utmost current Iut. An adder 59 adds the limited current Ilimit and a constant current $I_A$, wherein the constant current $I_A$ determines the minimum discharge current and decides the maximum off-time. A transistor 61 and a transistor 63 form an echo current mirror. Through the echo current mirror, the output of the adder 59 turns into the discharge current $I_D$. The gain G of the mirror amplifier 55 decides the slope of the decrement of the discharge current $I_D$ in response to the feedback voltage $V_{FB}$ decrement. Once the decrease of the feedback voltage $V_{FB}$ is close to the level of the threshold voltage $V_A$, the discharge current $I_D$ will be reduced and the switching period T will be increased continuously. When the feedback voltage $V_{FB}$ is higher than the threshold voltage $V_A$, the maximum discharge current $I_D$ is determined by the utmost current Iut, which decides the switching period T in the normal load and full load conditions. The minimum discharge current determines the maximum off-time and the maximum switching period. The charge current $I_C$ is a constant, which decides the maximum on-time of the switching period. Keeping the maximum on-time as the constant and increasing the switching period by increasing the off-time prevent the magnetic components from being saturated. FIG. 5 shows the waveform of the circuit in FIG. 2, in which an off-time modulation is included. The limited current Ilimit can be stated as $Ilimit=[(V_{FB}-V_A)/Rs]\times G;$ $0 \leq Ilimit \leq Iut$ $Ilimit=0V$ if $Ilimit \leq 0V;$ and $$Ilimit=Iut \text{ if } Ilimit \leq Iut;$$

Then $$I_C = K1;$$

$$I_D = (Ilimit + I_A) \times Gm;$$

And $$I_A \leq I_D \leq (Iut + I_A)$$

Where the Rs, the transfer function of V/I converter 53, is a resistor; the Gm is the gain of the echo current mirror, Gm=1; and the K1 is a constant.

Figure 6:
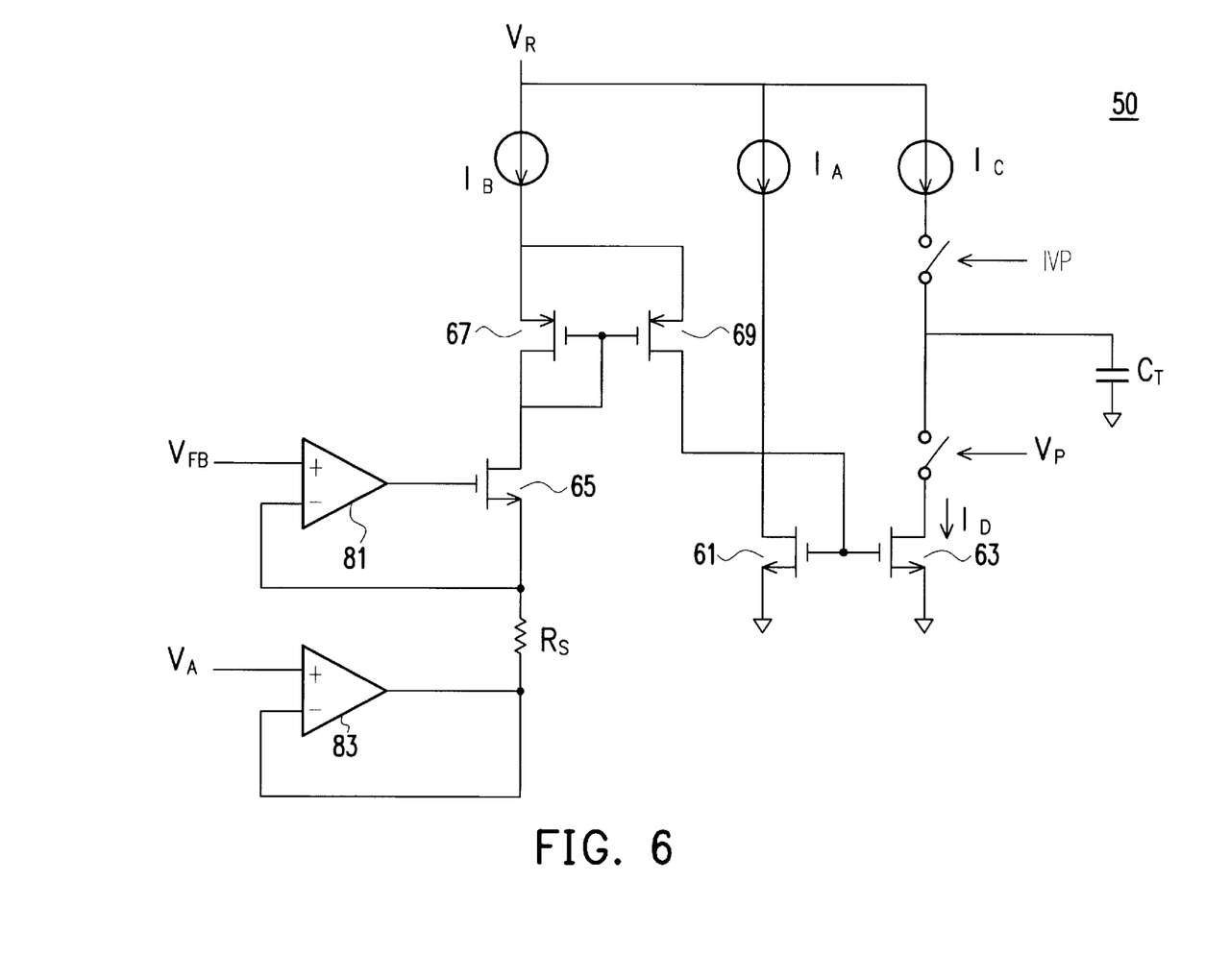
FIG. 6 shows an exemplary circuit of the off-time modulation shown in FIG. 4.

FIG. 6 shows an exemplary circuit of the off-time modulation shown in FIG. 4. An operational amplifier (op amp) 81, a transistor 65 and a resistor Rs form the V/I converter, which outputs the V/I current. Via an op amp 83, the threshold voltage $V_A$ is connected to the resistor Rs. The V/I current is then can be stated as $(V_{FB}-V_A)/Rs$; a transistor 67 associated with a transistor 69 develops the mirror amplifier and output san amplified current, in which the gates of the transistors 67, 69 and the drain of transistor 67 are tied together. The geometrical size of the transistors 67, 69 decides the gain G of the mirror amplifier. The V/I current is linked to the drain of transistor 67. The sourced of the transistors 67, 69 are tied together and then driven by a constant current $I_B$. Since the constant current $I_B$ limits the total current of the mirror amplifier, the utmost current Iut is equal to the current that the constant current $I_B$ subtracts the V/I current. Through the drain of the transistor 69, the mirror amplifier outputs the limited current $[(V_{FB}-V_A)/Rs] \times G$, which is limited between zero and the utmost current Iut. The transistors 61 and 63 form an echo current mirror, in which the gates of the transistors 61, 63 and the drain of the transistor 61 are tied together. The sources of the transistors 61 and 63 are grounded. The amplified current added to the constant current $I_A$ is connected to, the drain of the transistor 61, which is the input of the echo current mirror. The drain of the transistor 63 outputs the discharge current $I_D$. Because the geometrical size of the transistors 61 and 63 is identical, the gain of the echo current mirror Gm is equal to 1. Thus $$I_D = [(V_{FB}-V_A)/RS] \times G + I_A;$$

And $$I_A \leq I_D \leq (Iut + I_A)$$

The charge current $I_C$ is a constant, which decides the maximum on-time of the switching period. The maximum on-time remains constant and increases the switching period by increasing the off-time.

As described above, the PWM controller including an off-time modulation of the present invention can reduce the power consumption for the power converter in light load and no load conditions. Furthermore the off-time modulation will not cause magnetic saturation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A PWM controller having an off-time modulation to increase a switching period in light load and no load conditions, comprising:

an off-time modulator to provide a discharge current for a saw-tooth-signal generator to modulate the switching period of the PWM signal; in which a charge current of the saw-tooth-signal generator is kept constant.

2. A PWM controller as claimed in claim 1, wherein said off-time modulator generates a discharge current, which is a function of a feedback voltage and a threshold voltage; wherein the feedback voltage is derived from the voltage feedback loop of the power converter and the threshold voltage is a constant that decides the level of the light load condition.

3. A PWM controller as claimed in claim 2, wherein said feedback voltage and threshold voltage determine the function of the discharge current, in which the range of the discharge current is limited from a constant current to an utmost current; the constant current decides the maximum switching period, and the utmost current determines the minimum switching period, which is the switching period in the normal load and full load conditions.

4. A PWM controller as claimed in claim 1, wherein said off-time modulator modulates a switching period of the PWM signal, in which the switching period is increased corresponding to the decrease of the discharge current.

5. A PWM controller having an off-time modulation to increase a switching period in light load and no load conditions, comprising:

an off-time modulator to provide a discharge current for a saw-tooth-signal generator to modulate the switching period of the PWM signal; in which a charge current of the saw-tooth-signal generator is kept constant, wherein said off-time modulator comprises:

a first adder, in which the output of the first adder is the voltage that equals to the feedback voltage subtracting the threshold voltage;

a V/I converter for converting the voltage to the current, wherein the output of the first adder is converted to a V/I current;

a mirror amplifier for amplifying the V/I current and generating an amplified current, in which the gain of mirror amplifier determines the slope of the decrement of the discharge current in response to the feedback voltage decrement;

a limiter for clamping the amplified current to a limited current, wherein the amplitude of the limited current is in the range from zero to a high-limit current;

a second adder for adding the limited current with the constant current;

a first-echo transistor associated with a second-echo transistor developing an echo-current mirror, in which the discharge current is copied from the output of the second adder through the echo-current mirror.

6. A PWM controller having an off-time modulation to increase a switching period in light load and no load conditions, comprising:

an off-time modulator to provide a discharge current for a saw-tooth-signal generator to modulate the switching period of the PWM signal; in which a charge current of the saw-tooth-signal generator is kept constant, wherein said off-time modulator has an exemplary circuit comprising:

an input op amp, a buffer op amp, a resistor and a V/I transistor developing the V/I converter, wherein the feedback voltage is connected to the input of the input op amp, the threshold voltage connected to the input of the buffer op amp, the output of the input op amp drives the V/I transistor; wherein the V/I converter converts the voltage, which the feedback voltage subtracts the threshold voltage, to the V/I current via the resistor and the V/I transistor;

a first gain transistor associated with a second gain transistor developing the mirror amplifier and generating the amplified current; wherein the geometrical size of the first gain transistor and the second gain transistor decide the gain of the mirror amplifier; in which the gate of the first gain transistor, the gate of the second gain transistor and the drain of the first gain transistor are tied together, the V/I current drives the drain of the first gain transistor, the source of the first gain transistor and the source of the second gain transistor are tied together;

a limit current source associated with the mirror amplifier operating as the limiter that clamps the maximum output current of the mirror amplifier to the limited current; wherein the limit current source is attached to the gate of the second gain transistor and the limited current is outputted via the drain of the second gain transistor;

a constant current source to generate the constant current and decide the minimum discharge current; wherein the utmost current is the sum of the constant current and the maximum current of the limited current, in which the utmost current decides the maximum discharge current;

a first-echo transistor associated with the second-echo transistor developing the echo-current mirror and generating the discharge current; wherein the discharge current is copied from the input current of the echo-current mirror through the echo-current mirror, in which the input current of the echo-current mirror is the sum of the constant current and the limited current.

* * * * *